United States Patent
Wei

(10) Patent No.: US 10,260,676 B2
(45) Date of Patent: Apr. 16, 2019

(54) STABILIZER

(71) Applicant: Chengyun Wei, Guangxi (CN)

(72) Inventor: Chengyun Wei, Guangxi (CN)

( * ) Notice: Subject to any disclaimer, the term of this patent is extended or adjusted under 35 U.S.C. 154(b) by 0 days.

(21) Appl. No.: 15/851,725

(22) Filed: Dec. 21, 2017

(65) Prior Publication Data
US 2019/0063676 A1 Feb. 28, 2019

(30) Foreign Application Priority Data
Aug. 24, 2017 (CN) .......................... 2017 1 0734069

(51) Int. Cl.
*F16M 13/04* (2006.01)
*G03B 17/56* (2006.01)

(52) U.S. Cl.
CPC ........... *F16M 13/04* (2013.01); *G03B 17/561* (2013.01); *G03B 17/563* (2013.01); *F16M 2200/041* (2013.01)

(58) Field of Classification Search
CPC ........................ G03B 17/561; G03B 17/563
See application file for complete search history.

(56) References Cited

U.S. PATENT DOCUMENTS

| 9,921,464 B1* | 3/2018 | Choi | .................. G03B 37/00 |
| 2018/0212211 A1* | 7/2018 | Liang | .................. H01M 2/105 |

* cited by examiner

*Primary Examiner* — Noam Reisner

(57) ABSTRACT

The invention provides a stabilizer, comprising a first connecting part, a fixing ring, a second connecting part and a rotating component, wherein one end of the fixing ring is sleeved at the first connecting part, the fixing ring and the rotating component are respectively detachably mounted on two ends of the second connecting part. With such configuration, the first connecting part and the second connecting part are connected by the fixing ring rather than being directly connected with each other, thereby providing a stable connection between the first connecting part and the second connecting part and facilitating easy assembly and disassembly and the whole stabilizer having a plurality of detachable components is convenient to package and carry. Moreover, due to the detachable mounting structure of the stabilizer, it is easy to replace the components of the stabilizer when a failure of the components occurs.

8 Claims, 2 Drawing Sheets

STABILIZER

CROSS-REFERENCE TO PRIOR APPLICATION

This application claims the benefit of Chinese Patent Application No. 201710734069.0 filed on Aug. 24, 2017, the contents of which are incorporated herein by reference.

FIELD OF THE INVENTION

The present invention relates to the technical field of camera stabilizers, more particularly to a stabilizer.

BACKGROUND OF THE INVENTION

As high-definition photographic equipment and smart phones become more and more popular, better quality of the captured images and videos is required. In particular, due to the stability problem, people can hardly catch clear pictures either by handheld equipment or selfie stick during moving. The quality of the images and videos is greatly affected by camera shake. In light of the problems above, the stabilizers are provided for fixing the photographic equipment and adjusting its position (e.g. the orientation, rolling angle and pitching angle), and for stabilizing it at a determined position, so as to achieve a stable and smooth multi-angle shooting.

The stabilizers interiorly include a power line, a signal line, and a control circuit board. However, in order to avoid a damage of the electronic components inside the stabilizer, the stabilizers usually have an un-detachable structure, and the whole device is not convenient to carry and package. Furthermore, it is not convenient to replace the components of the stabilizer, which causes some inconvenience during using.

SUMMARY OF THE INVENTION

The present invention aims to provide a stabilizer with a plurality of detachable components, which can be convenient to package and carry and has the components and parts that are easy to replace.

To this end, the present invention provides a stabilizer, comprising a first connecting part, a fixing ring, a second connecting part and a rotating component, wherein one end of the fixing ring is sleeved at an end of the first connecting part, and the fixing ring and the rotating component are respectively detachably mounted on two ends of the second connecting part.

In a preferred embodiment, the first connecting part may be a connecting base which comprises a first lug boss, and one end of the fixing ring may be sleeved at the first lug boss. The second connecting part may be a connecting cap which comprises a second lug boss, and the second lug boss may be connected with an inner wall of the fixing ring by a threaded connection.

In a preferred embodiment, the rotating component is used for changing the orientation of the photographic equipment. The rotating component comprises a third lug boss, and the connecting cap is sleeved at the third lug boss.

In a preferred embodiment, a mounting plate may be further provided, a baffle ring may be arranged at an inner wall of the fixing ring, and the mounting plate abuts against the baffle ring and is fixedly connected with the connecting base.

In a preferred embodiment, the first lug boss may be provided with a first mounting hole, the mounting plate may be provided with a second mounting hole corresponding to the first mounting hole, and a screw passes through the second mounting hole and the first mounting hole.

In a preferred embodiment, the mounting plate is connected with an adapter plate. A power line and a signal line are mounted inside the connecting base, and a socket connected with the power line and the signal line is arranged on one side of the adapter plate. A control circuit board is mounted inside the connecting cap. The control circuit board is arranged with a pogo pin plate which is mounted with pogo pins. The second lug boss is provided with a through hole, and the adapter plate is provided with pogo pin holes which correspond to the pogo pins. The pogo pin plate passes through the through hole, and the pogo pins pass through the pogo pin holes which are in communication with a jack of the socket and then inserted into the jack of the socket.

In a preferred embodiment, the mounting plate may be arranged with a slot, and the adapter plate may be engaged in the slot.

In a preferred embodiment, the screw may be a round head screw, and the second lug boss may be provided with a positioning hole fitting with a nut of the round head screw.

In a preferred embodiment, the first connecting part may be connected at one end with a handle, which may be a single handle or a double-handle, and the rotating component is connected with a fixing part for fixing the photographic equipment.

In a preferred embodiment, the fixing ring is provided with skid proof stripes on an external wall.

The embodiments of the present invention have advantages as follows.

1. Since the first connecting part and the second connecting part are connected by the fixing ring rather than being directly connected with each other, a stable connection can be provided between the first connecting part and the second connecting part and easy assembly and disassembly are facilitated. Furthermore, since the fixing ring and the rotating component are respectively detachably mounted on two ends of the second connecting part, the first connecting part, the second connecting part and the rotating component can be detached from each other due to the above connecting structure, so that the whole stabilizer with a plurality of detachable components is convenient to package and carry. Moreover, due to the detachable mounting structure of the stabilizer, it is easy to replace the components or parts of the stabilizer when a failure of the components or parts of the stabilizer occurs, and a better user experience is provided.

2. The connecting base comprises a first lug boss, one end of the fixing ring is sleeved at the first lug boss, and the connecting cap comprises a second lug boss which is connected with an inner wall of the fixing ring by a threaded connection. With the above connecting structure, the fixing ring has one end sleeved at an end of the connecting base and another end connected with the inner wall of the connecting cap by the threaded connection, so that the assembly and disassembly of the fixing ring and the connecting cap can be achieved by screwing the fixing ring, thereby providing a stable connection and convenient disassembly for the connecting base and the connecting cap.

3. The fixing ring is fixedly connected with the connecting base by the mounting plate. Due to the mounting plate, the fixing ring is fixed along its central axis direction and may only rotate to allow assembly and disassembly of the fixing ring and the connecting cap, thereby facilitating convenient assembly and disassembly of the fixing ring and the connecting base. Furthermore, since the mounting plate is fixedly connected with the first lug boss by a screw, a stable connection with a simple connecting structure is provided.

4. The mounting plate is connected with an adapter plate, a power line and a signal line are mounted inside the connecting base, and a socket connected with the power line and the signal line is arranged on one side of the adapter plate. Furthermore, a control circuit board is mounted inside the connecting cap, the control circuit board is arranged with a pogo pin plate which is mounted with pogo pins, and the adapter plate is provided with pogo pin holes which correspond to the pogo pins. The pogo pin plate passes through the through hole, and the pogo pins pass through the pogo pin holes which are communicated with the jack of the socket and then inserted into the jack of the socket. With the above connecting structure, the power line and the signal line arranged inside the connecting base are connected with the control circuit board arranged inside the connecting cap, a stable connection relationship is provided and less space is required due to the adapter plate. Since the device has a clear connection relationship, it is easy to repair and assemble.

5. The screw is a round head screw, and the second lug boss is provided with a positioning hole fitting with a nut of the round head screw, such that the round head screw can be aligned with the positioning hole and the connecting base can be aligned and connected with the connecting cap, and meanwhile the pogo pins can be aligned with the pogo pin holes, thereby facilitating easy assembly.

6. The handle is a single handle which is convenient to operate by single hand, or a double-handle which provides a stable operation by double-hand. The two types of handles can satisfy different users' demands.

7. The fixing ring is provided with skid proof stripes on an external wall, so that it is easier to screw the fixing ring.

In the figures: 1. first connecting part; 2. fixing ring; 3. second connecting part; 4. rotating component; 5. mounting plate; 6. screw; 7. adapter plate; 8. handle; 9. fixing part; 11. first lug boss; 21. baffle ring; 22. skid proof stripes; 31. second lug boss; 32. control circuit board; 41. third lug boss; 51. second mounting hole; 52. slot; 61. nut; 71. pogo pin hole; 11a. first mounting hole; 31a. positioning hole; 31b. through hole; 32a. pogo pin plate.

DETAILED DESCRIPTION OF ILLUSTRATED EMBODIMENTS

The technical solutions of the embodiments of the present invention will be clearly and completely explained below in conjunction with the figures of the embodiments. It is apparent that the described embodiments are merely some embodiments of the present invention, but are not to limit the invention in any form. On the basis of these embodiments of the present invention, those skilled in the art may get other equivalent embodiments without involving any inventive step. The present invention is intended to cover all equivalent arrangements included within the scope of the present invention.

Figure 1:
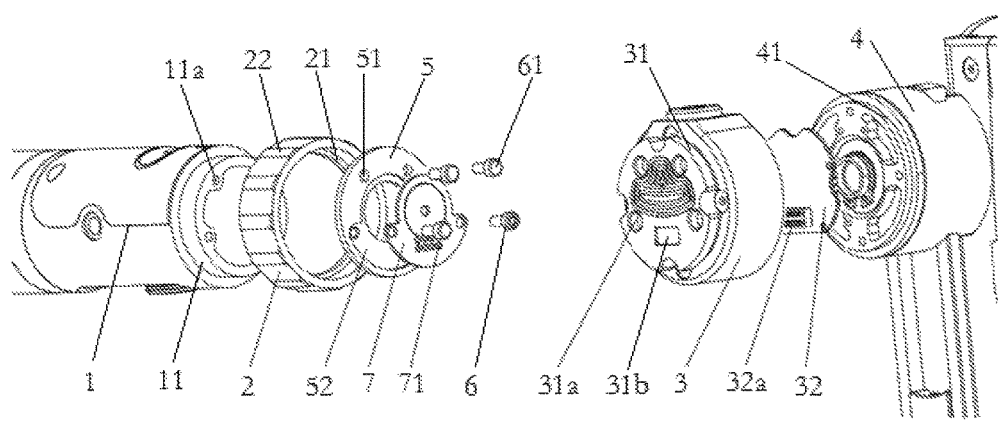
FIG. 1 is an exploded drawing of a stabilizer according to an embodiment of the present invention.
Figure 2:
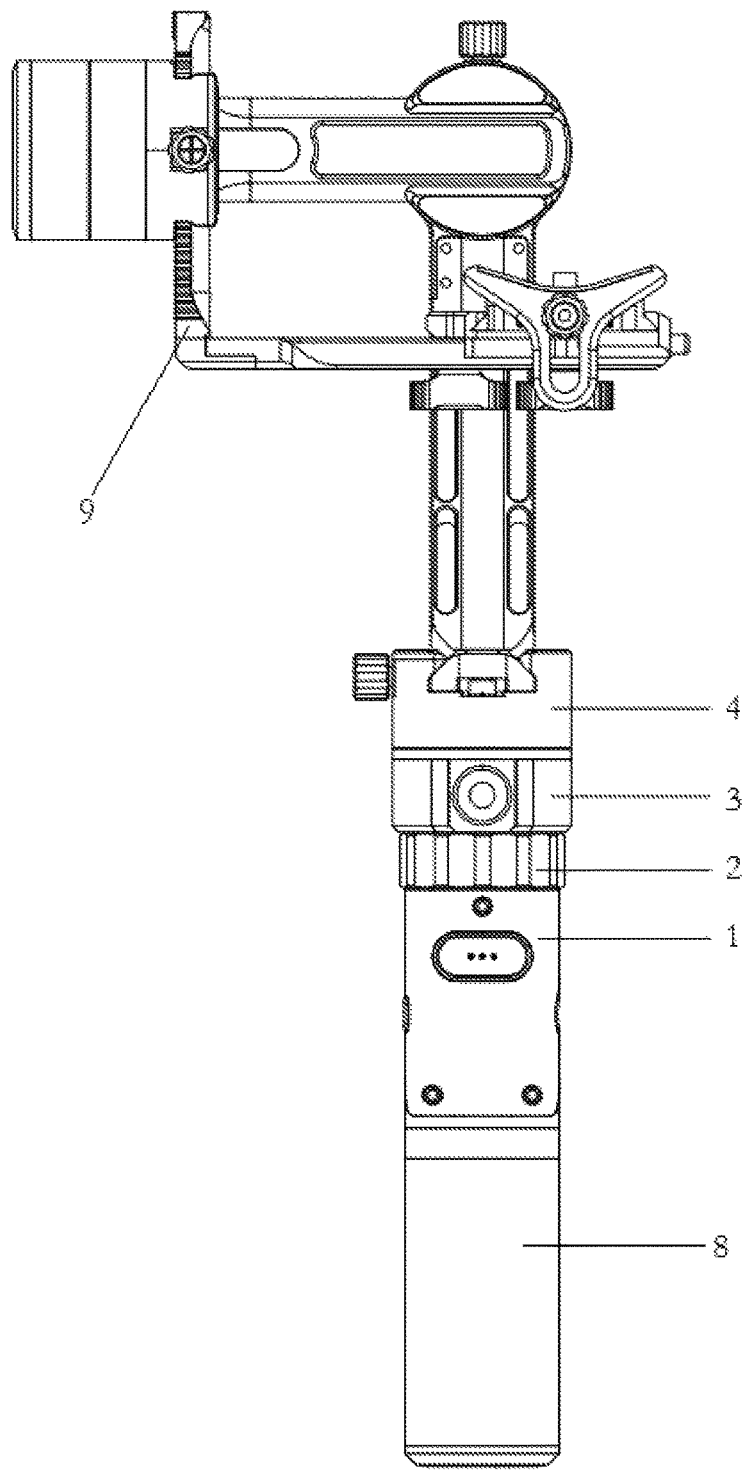
FIG. 2 is a schematic view illustrating an integral structure of a stabilizer according to an embodiment of the present invention.

Referring to FIG. 1 and FIG. 2, a stabilizer is provided in an embodiment, which comprises a first connecting part 1, a fixing ring 2, a second connecting part 3 and a rotating component 4, wherein one end of the fixing ring 2 is sleeved at an end of the first connecting part 1, the fixing ring 2 and the rotating component 4 are respectively detachably mounted on two ends of the second connecting part 3, such that the first connecting part 1 and the second connecting part 3 are connected by the fixing ring 2, whereby a stable mounting structure is provided. Furthermore, the first connecting part 1, the second connecting part 3 and the rotating component 4 can be detached from each other, thereby facilitating convenient assembly and disassembly. It should be noted that, the first connecting part 1 of the stabilizer is connected with a handle 8, and the rotating component 4 is connected with a fixing part 9 for fixing photographic equipment by a connecting rod. The rotating component 4 is rotatable, and the fixing part 9 itself is also rotatable, thereby allowing the photographic equipment to perform a multi-angle shooting. Although the whole stabilizer takes up a larger space, the stabilizer having a plurality of detachable components is convenient to package and carry because the first connecting part 1, the second connecting part 3 and the rotating component 4 can be detached from each other.

With the above configuration, the first connecting part 1 and the second connecting part 3 are connected by the fixing ring 2 rather than being directly connected with each other, thereby providing a stable connection between the first connecting part 1 and the second connecting part 3 and facilitating easy assembly and disassembly. Furthermore, since the fixing ring 2 and the rotating component 4 are respectively detachably mounted on two ends of the second connecting part 3, the first connecting part 1, the second connecting part 3 and the rotating component 4 can be detached from each other due to the connecting structure, so that the whole stabilizer having a plurality of detachable components is convenient to package and carry. Moreover, due to the detachable mounting structure of the stabilizer, it is easy to replace the components of the stabilizer when a failure of the components of the stabilizer occurs, thereby providing a better user experience for the users.

In the present embodiment, the first connecting part 1 is a connecting base which comprises a first lug boss 11, and one end of the fixing ring 2 is sleeved at the first lug boss 11. It should be noted that, though the fixing ring 2 is rotatable relative to the first lug boss 11, the fixing ring 2 is fixed in its central axis direction. The second connecting part 3 is a connecting cap which comprises a second lug boss 31, and the second lug boss 31 is connected with an inner wall of the fixing ring 2 by a threaded connection. With the above connecting structure, the fixing ring 2 has one end sleeved at one end of the connecting base and another end connected with the inner wall of the connecting cap by the threaded connection, so that the assembly and disassembly of the fixing ring 2 and the connecting cap can be achieved by screwing the fixing ring 2, thereby providing a stable connection and convenient disassembly for the connecting base and the connecting cap.

Furthermore, the rotating component 4 is used for changing the orientation of the photographic equipment. It should be noted that, the rotating component 4 comprises two rotation shafts, one of which is connected with a connecting rod, and the connecting rod is connected with a rotatable fixing part 9 for fixing the photographic equipment. With such configuration, the photographic equipment is capable of performing multi-angle shooting. The rotating component 4 comprises a third lug boss 41, and the connecting cap is sleeved at the third lug boss 41. It should be noted that, the connecting cap is fixed with the third lug boss 41 by a connection including but not limited to screw connection.

For example, in order to achieve a stable connection, the third lug boss 41 may be connected with the inner wall of the connecting cap by a threaded connection. With the above connecting structure, the connecting cap and the rotating component 4 can be connected stably and are easy to detach.

Preferably, the stabilizer in the present embodiment further comprises a mounting plate 5, a baffle ring 21 is arranged at the inner wall of the fixing ring 2, and the mounting plate 5 abuts against the baffle ring 21 and is fixedly connected with the connecting base. In this way, due to the mounting plate 5, the fixing ring 2 is fixed along its central axis direction and may only rotate to allow assembly and disassembly of the fixing ring 2 and the connecting cap, thereby facilitating convenient assembly and disassembly of the fixing ring 2 and the connecting base. Furthermore, the first lug boss 11 is provided with a first mounting hole 11a, the mounting plate 5 is provided with a second mounting hole 51 corresponding to the first mounting hole 11a, and a screw 6 passes through the second mounting hole 51 and the first mounting hole 11a. In this way, a stable connection by means of the screw 6 is provided, which has a simple connecting structure.

Herein, the mounting plate 5 is connected with an adapter plate 7. A power line and a signal line are mounted inside the connecting base, and a socket connected with the power line and the signal line is arranged on one side of the adapter plate 7. A control circuit board 32 is mounted inside the connecting cap. The control circuit board 32 is arranged with a pogo pin plate 32a, and the pogo pin plate 32a is mounted with pogo pins. The pogo pin is a device usually used in electronics to establish a precision connection and improve connection stability. The second lug boss 31 is provided with a through hole 31b, and the adapter plate 7 is provided with pogo pin holes 71 which correspond to the pogo pins. The pogo pin plate 32a passes through the through hole 31b, and the pogo pins pass through the pogo pin holes 71 which are communicated with the jack of the socket and then inserted into the jack of the socket. With the above connecting structure, the power line and the signal line arranged inside the connecting base are connected with the control circuit board 32 arranged inside the connecting cap, a stable connection relationship is provided and less space is required due to the adapter plate 7. Since the device has a simple and clear connection relationship, it is easy to repair and assemble. Furthermore, the mounting plate 5 is arranged with a slot 52, and the adapter plate 7 is engaged in the slot 52, so that the adapter plate 7 is steadily engaged with the mounting plate 5.

Moreover, the screw 6 may be a round head screw, and the second lug boss 31 is provided with a positioning hole 31a fitting with a nut 61 of the round head screw 6, such that the round head screw 6 can be aligned with the positioning hole 31a and the connecting base can be aligned and connected with the connecting cap, and meanwhile the pogo pins can be aligned with the pogo pin holes 71, thereby facilitating a very easy assembly of the connecting base and the connecting cap.

In the present embodiment, a handle 8 is connected to an end of the first connecting part 1. The handle 8 may be a single handle 8 which is convenient to operate by single hand, or a double-handle 8 which provides a stable operation by double-hand. Two types of handles 8 can satisfy different users' demands. The rotating component 4 is connected with the fixing part 9 for fixing the photographic equipment, such that the fixing part 9 can be controlled to rotate by means of the rotating component 4, so as to adjust the orientation including the angle and the direction of the photographic equipment.

Furthermore, in order to facilitate the adjustment of the fixing ring 2, skid proof stripes 22 are provided on an external wall of the fixing ring 2. During disassembly or replacement of some components or parts, the fixing ring 2 can be unscrewed in a simple manner to allow a disassembly of the first connecting part 1 and the second connecting part 3.

In conclusion, in the stabilizer of the embodiment of the present invention, the first connecting part 1 and the second connecting part 3 are connected by the fixing ring 2 rather than being directly connected with each other, thereby providing a stable connection between the first connecting part 1 and the second connecting part 3 and facilitating easy assembly and disassembly. Furthermore, since the fixing ring 2 and the rotating component 4 are respectively detachably mounted on two ends of the second connecting part 3, the first connecting part 1, the second connecting part 3 and the rotating component 4 can be detached from each other due to the connecting structure, so that the whole stabilizer having a plurality of detachable components is convenient to package and carry. Moreover, due to the detachable mounting structure of the stabilizer, it is easy to replace the components or parts of the stabilizer when a failure of the components or parts of the stabilizer occurs, thereby providing a better user experience for the users.

It should be understood that the terms in the present invention such as "first" and "second" are intended as illustrative rather than limiting. These terms are used for distinguishing same type of parts from each other. For example, the "first" part can also be referred to as the "second" part and the "second" part can also be referred to as the "first" part without departing from the scope of the present invention.

All the above are merely preferred embodiments of the present invention. It should be noted that, those skilled in the art may obtain some modifications and equivalent arrangements within the principle of the present invention. The present invention is intended to cover all modifications and equivalent arrangements included within the scope of the present invention.

The invention claimed is:

1. A stabilizer, characterized in that, it comprises a first connecting part, a fixing ring, a second connecting part and a rotating component, wherein one end of the fixing ring is sleeved at an end of the first connecting part, and the fixing ring and the rotating component are respectively detachably mounted on two ends of the second connecting part;

the first connecting part is a connecting base which comprises a first lug boss, and one end of the fixing ring is sleeved at the first lug boss; the second connecting part is a connecting cap which comprises a second lug boss, and the second lug boss is connected with an inner wall of the fixing ring by a threaded connection;

the rotating component is used for changing an orientation of a photographic device, the rotating component comprises a third lug boss, and the connecting cap is sleeved at the third lug boss.

2. The stabilizer according to claim 1, characterized in that, a mounting plate is further provided, and a baffle ring is arranged at an inner wall of the fixing ring, and the mounting plate abuts against the baffle ring and is fixedly connected with the connecting base.

3. The stabilizer according to claim 2, characterized in that, the first lug boss is provided with a first mounting hole, the mounting plate is provided with a second mounting hole which corresponds to the first mounting hole, and a screw passes through the second mounting hole and the first mounting hole.

4. The stabilizer according to claim 3, characterized in that, the mounting plate is connected with an adapter plate, a power line and a signal line are mounted inside the connecting base, a socket connected with the power line and the signal line is arranged on one side of the adapter plate, a control circuit board is mounted inside the connecting cap, the control circuit board is arranged with a pogo pin plate which is mounted with a pogo pin, the second lug boss is provided with a through hole, the adapter plate is provided with a pogo pin hole which corresponds to the pogo pin, the pogo pin plate passes through the through hole, and the pogo pin passes through the pogo pin hole which is communicated with a jack of the socket and then inserted into the jack of the socket.

5. The stabilizer according to claim 4, characterized in that, the mounting plate is arranged with a slot, and the adapter plate is engaged in the slot.

6. The stabilizer according to claim 3, characterized in that, the screw is a round head screw, and the second lug boss is provided with a positioning hole fitting with a nut of the round head screw.

7. The stabilizer according to claim 1, characterized in that, the first connecting part is connected at one end with a handle, which is a single handle or a double-handle, and the rotating component is connected with a fixing part for fixing a photographic device.

8. The stabilizer according to claim 1, characterized in that, the fixing ring is provided with skid proof stripes on an external wall.

* * * * *